(12) United States Patent
Weed et al.

(10) Patent No.: US 12,459,676 B1
(45) Date of Patent: Nov. 4, 2025

(54) THERMAL RADIATOR FOR HEAT REJECTION

(71) Applicant: BAE Systems Space & Mission Systems Inc., Broomfield, CO (US)

(72) Inventors: Kevin Eugene Weed, Boulder, CO (US); David M. Waller, Westminster, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 245 days.

(21) Appl. No.: 18/144,698

(22) Filed: May 8, 2023

(51) Int. Cl.
  *F28F 7/00* (2006.01)
  *B33Y 80/00* (2015.01)
  *B64G 1/50* (2006.01)

(52) U.S. Cl.
  CPC .............. *B64G 1/503* (2013.01); *B33Y 80/00* (2014.12)

(58) Field of Classification Search
  CPC ................................ B64G 1/503; B33Y 80/00
  USPC ......................................................... 165/185
  See application file for complete search history.

(56) References Cited

U.S. PATENT DOCUMENTS

| | | | |
|---|---|---|---|
| 5,310,141 A | 5/1994 | Homer et al. | |
| 6,432,344 B1 | 8/2002 | Eckman et al. | |
| 8,820,684 B2 | 9/2014 | McKinnon et al. | |
| 8,910,701 B2 | 12/2014 | Sepulveda et al. | |
| 9,411,102 B2 | 8/2016 | Gidon | |
| 9,976,815 B1* | 5/2018 | Roper | F28D 7/08 |
| 10,782,189 B2 | 9/2020 | Wei et al. | |
| 11,053,029 B1 | 7/2021 | Goodzeit et al. | |
| 11,204,283 B2 | 12/2021 | Wei et al. | |
| 11,204,284 B2 | 12/2021 | Wei et al. | |
| 11,226,238 B2 | 1/2022 | Wei et al. | |

FOREIGN PATENT DOCUMENTS

| | | | |
|---|---|---|---|
| CN | 101018462 A | * | 8/2007 |
| CN | 101201154 A | * | 6/2008 |
| CN | 109233282 A | * | 1/2019 |

* cited by examiner

*Primary Examiner* — Davis D Hwu
(74) *Attorney, Agent, or Firm* — Sheridan Ross P.C.

(57) ABSTRACT

Radiator structures and methods are provided. The radiator includes conductor bar and radiating surface portions that are integral to one another. An interior surface of the conductor bar and an interior surface of the radiating surface form a continuous internal surface, and an exterior surface of the conductor bar and an exterior surface of the radiating surface form a continuous external surface. The overall form of the radiating surface can be similar to that of a flared bell, such that an interior surface of the conductor bar is exposed at a base of the flared radiating surface. Surface features can be formed on one for both of the exterior and interior surfaces of the radiator. The radiating surface can also include voids. Aspects of surface features and voids can vary with distance from a thermal interface with a heat source. The radiator structures can be formed using additive manufacturing processes.

20 Claims, 15 Drawing Sheets

THERMAL RADIATOR FOR HEAT REJECTION

CROSS-REFERENCE TO RELATED APPLICATION

This application claims the benefit of U.S. Provisional Patent Application Ser. No. 63/343,002, filed May 17, 2022, the entire disclosure of which is hereby incorporated herein by reference.

FIELD

This disclosure is directed to thermal radiator structures having a radiating surface and an integrated conductor bar.

BACKGROUND

Precision instruments often require precise temperature control. For space-based instruments, telescopes, and spacecraft, waste heat must be rejected through radiant heat transfer. Accordingly, space-based thermal control systems generally feature a radiator on an exterior of the spacecraft or instrument. In order to provide high thermal emission efficiency, radiators that mimic a hohlraum type blackbody with efficiencies that approach the maximum 1.0 emissivity limit have been developed. However, where the source of the waste heat is internal to the spacecraft or instrument, a conductive link between the source and the radiator is required. The transfer of heat from the source to the radiator has been accomplished through various structures or systems, such as heat pipes, fluid loops, and conductor bars. These structures and systems typically suffer from the inclusion of multiple interfaces along the conductive link, which add to inefficiencies in heat transfer. In addition, radiators have been formed from multiple components, which creates additional thermal interfaces, further increasing inefficiencies. Moreover, such radiators have typically featured a planar radiating component surface, which prevents the conductor bar component from effectively contributing to the operation of the radiator as a radiating surface. Accordingly, it would be desirable to provide systems and methods for removing heat from space-based heat generating systems that provided a high-efficiency thermal connection between the heat generating system and a high-efficiency radiator.

SUMMARY

Embodiments of the present disclosure provide novel systems and methods for removing heat from space-based instruments, telescopes, and spacecraft. In accordance with embodiments of the present disclosure, a radiating system having a highly efficient radiating surface and an integrated conductor bar is provided. The radiating surface includes an overall shape and macroscopic features that increase the apparent surface area of the radiator. The conductor bar includes an interior surface that is exposed to space, allowing the conductor bar to effectively participate in the operation of the radiator as a radiating surface, in addition to providing a heat conductive link to the heat generating system. In accordance with at least some embodiments of the present disclosure, the radiator replicates a hohlraum radiator.

In accordance with embodiments of the present disclosure, the radiator takes the shape required by the specific application. As an example, the overall form of the radiator can be asymmetrical. Alternatively or in addition, the overall form of the radiator can include curved surfaces. In accordance with at least some embodiments of the present disclosure, the radiator can include macroscopic surface features. Such macroscopic surface features can be provided to increase the strength, stiffness, and/or radiating surface area of the radiator, and can be in the form of lattice structures, such as but not limited to triply periodic minimal surfaces. In accordance with further embodiments of the present disclosure, other topologies for providing a high apparent surface area can be used. In accordance with still further embodiments of the present disclosure, the radiator can include microscopic surface features, such as but not limited to carbon nanotube structures formed on the surface of the radiator.

In accordance with embodiments of the present disclosure, the radiating system is formed using additive manufacturing techniques. The radiator can be formed using one or a number of different materials. Where different materials are used, the particular material used in any one area of the radiator can be selected to provide tailored strength, stiffness, and or thermal characteristics. As a particular example, but without limitation, a strong and highly conductive material, such as copper, can be used in the conductor bar portion of the radiator, particularly in cryogenic applications, while titanium can be used for macroscopic surface feature portions for strength, light weight, and low conductance, with thermally conductive surfaces disposed between adjacent macroscopic features.

Additional features and advantages of embodiments of the disclosed systems and methods will become more readily apparent from the following description, particularly when taken together with the accompanying drawings.

DETAILED DESCRIPTION

Figure 1:
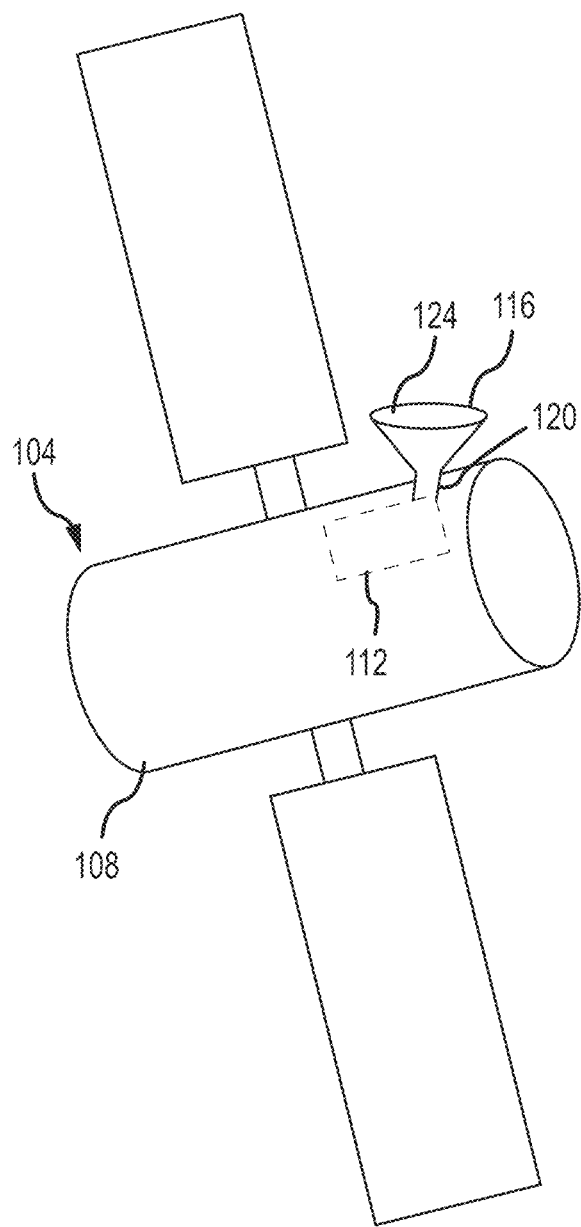
FIG. 1 depicts an example space-based system with a heat source and a radiator in accordance with embodiments of the present disclosure.

FIG. 1 depicts components of a space-based system 104 including a platform 108, such as a spacecraft or satellite, and a heat source 112. Also shown is a radiating system or radiator 116 in accordance with embodiments of the present disclosure. In general, the radiator 116 includes a conductor bar 120 that is thermally connected to the heat source 112, and a radiating surface 124. Moreover, as discussed in greater detail elsewhere herein, the conductor bar 120 and radiating surface 124 portions of the radiator 116 can be integral to one another, and can be formed using additive manufacturing processes.

The heat source 112 can include any heat generating component, or any component that is exposed to internal or external sources of heat and that requires cooling. As examples, but without limitation, the heat source 112 is an instrument, power supply, processor, communication system, or any other component or system that requires cooling. Moreover, although depicted as carried by a platform 108 in the form of a spacecraft or satellite, a radiator 116 in accordance with embodiments of the present disclosure can provide radiational cooling in connection with other systems and environments. As shown in this example, the heat source 112 can be internal to the spacecraft 108. In accordance with other embodiments of the present disclosure, the heat source 112 can be internal, external, or partially internal and partially external to a spacecraft 108 or other system or platform.

In general, the radiator 116 is in thermal contact with the heat source 112. In a typical implementation, the thermal contact is achieved by placing a surface of the conductor bar 120 portion of the radiator 116 in direct contact with a surface of the heat source 112 (i.e. the component or system from which heat is to be removed). The radiating surface 124 portion of the radiator 116 extends from an area that encompasses the conductor bar 120 portion, into an enlarged radiating surface 124 portion distal from the heat source 112.

Figure 2:
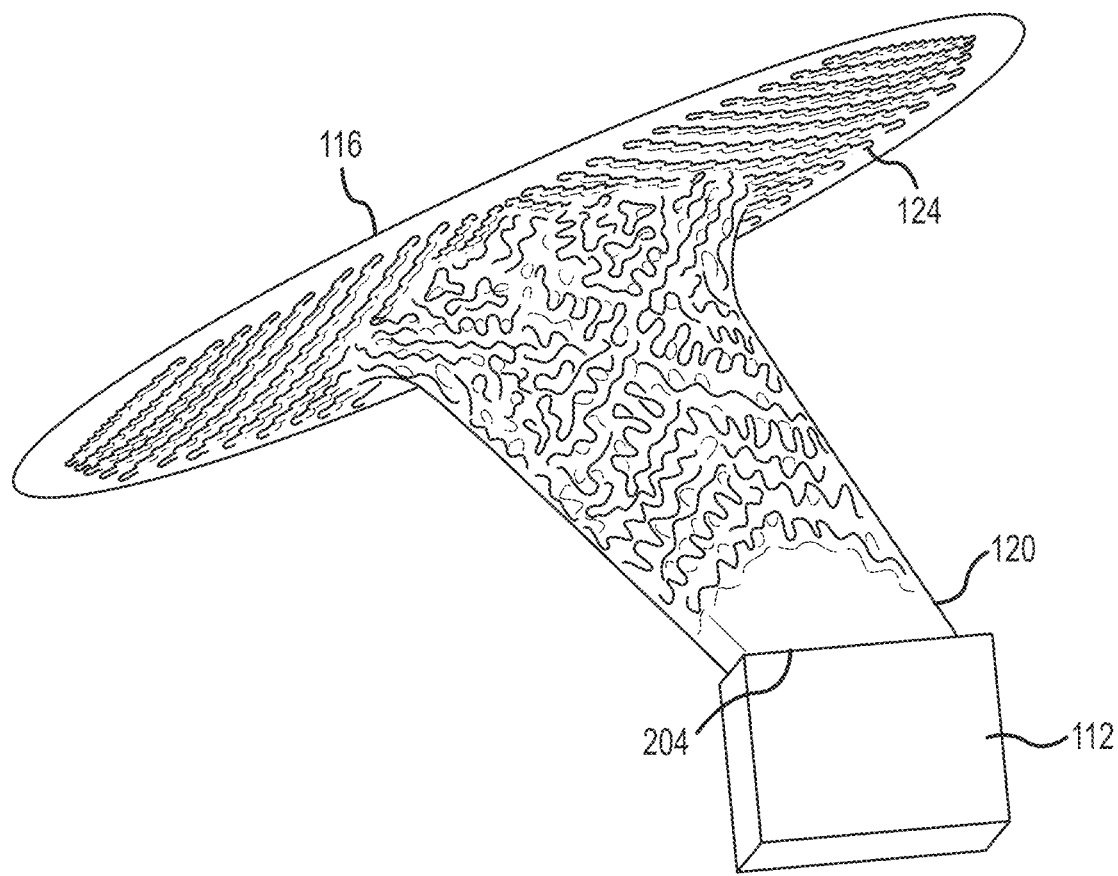
FIG. 2 illustrates a heat source and an attached radiator in accordance with embodiments of the present disclosure.

FIG. 2 illustrates a heat source 112 and a radiator 116 in accordance with embodiments of the present disclosure. As shown, the radiator 116 conductor bar 120 is thermally interfaced with the heat source 112 by direct contact between the two. The area of contact 204 is configured as a thermal interface, across which heat is transferred between the heat source 112 and the radiator 116. In accordance with embodiments of the present disclosure, the area of contact 204 is the only discontinuity or interface between separate component parts. In particular, the conductor bar 120 and the radiating surface 124 of the radiator 116 are integral to one another. Alternatively, a heat transfer medium or structure can be interposed between the heat source 112 and the radiator 116, in which case the area of contact is established between the heat transfer medium or structure and the radiator 116.

FIGS. 3A-3D are line drawings and FIGS. 4A-4D are gray scale images illustrating aspects of a radiator or radiating system 116 in accordance with embodiments of the present disclosure. As shown in the figures, the radiator 116 is generally formed as an integrated, unitary structure. Accordingly, the conductor bar 120 portion and the radiating surface 124 portion of the radiator 116 are provided as a single, integral structure. Moreover, the radiator 116 may be a self-supporting structure. The conductor bar 120 includes a thermal interface surface or area 304 that defines or is placed within an area of contact 204 with the heat source 112 or an intermediate heat transfer medium or structure, and that is configured to receive heat from the heat source 112. As can be appreciated by one of skill in the art after consideration of the present disclosure, the thermal interface surface 304 can be placed in direct contact with a surface of the heat source 112, or the radiator 116 and the heat source 112 can be thermally connected to one another by an interface medium, such as a conductive paste, adhesive, or film. In accordance with further embodiments of the present disclosure, the thermal interface surface 304 can be thermally connected to the heat source 112 by an intermediate heat transfer structure or system.

Figure 3A:
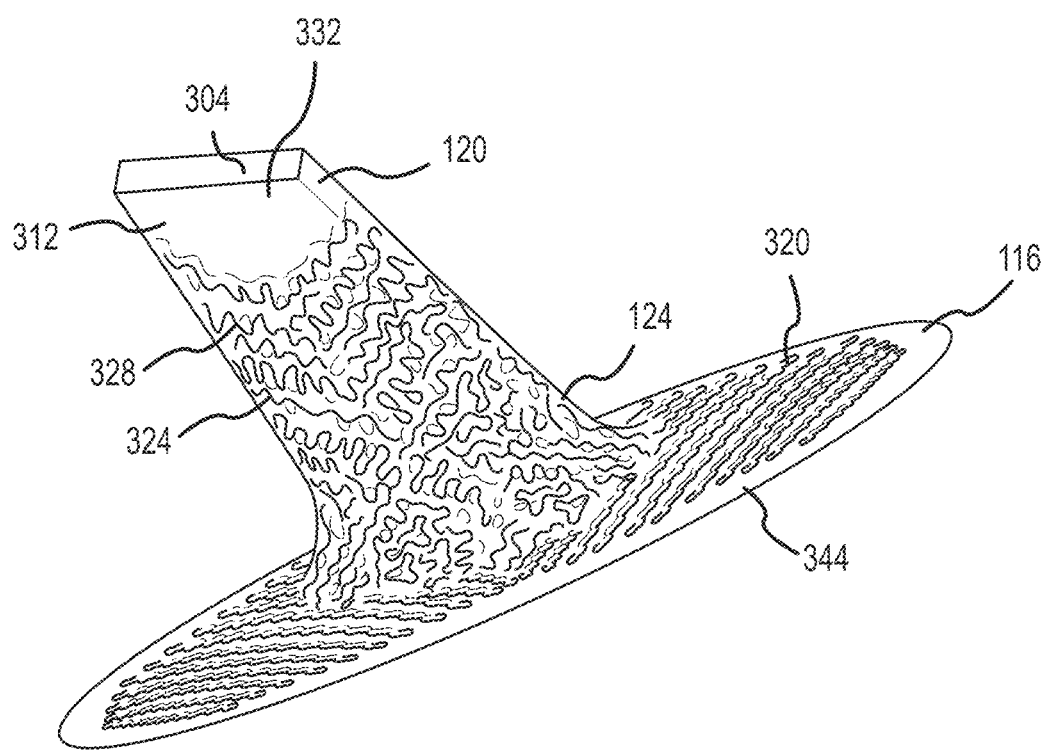
FIGS. 3A-3D are views illustrating a radiator in accordance with embodiments of the present disclosure.
Figure 3B:
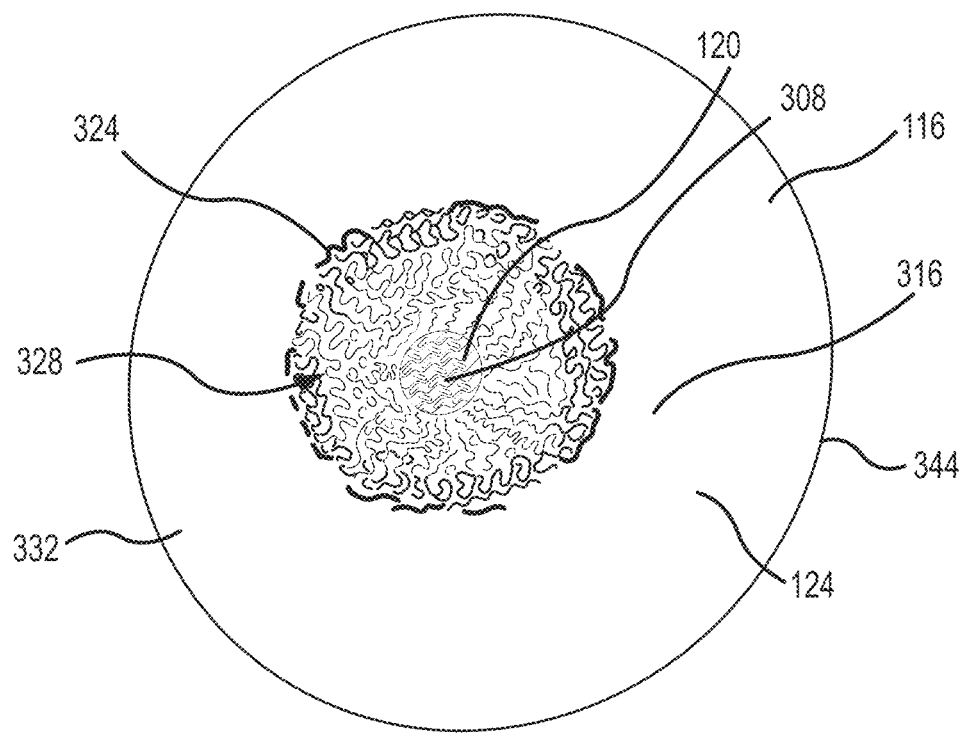
Figure 3C:
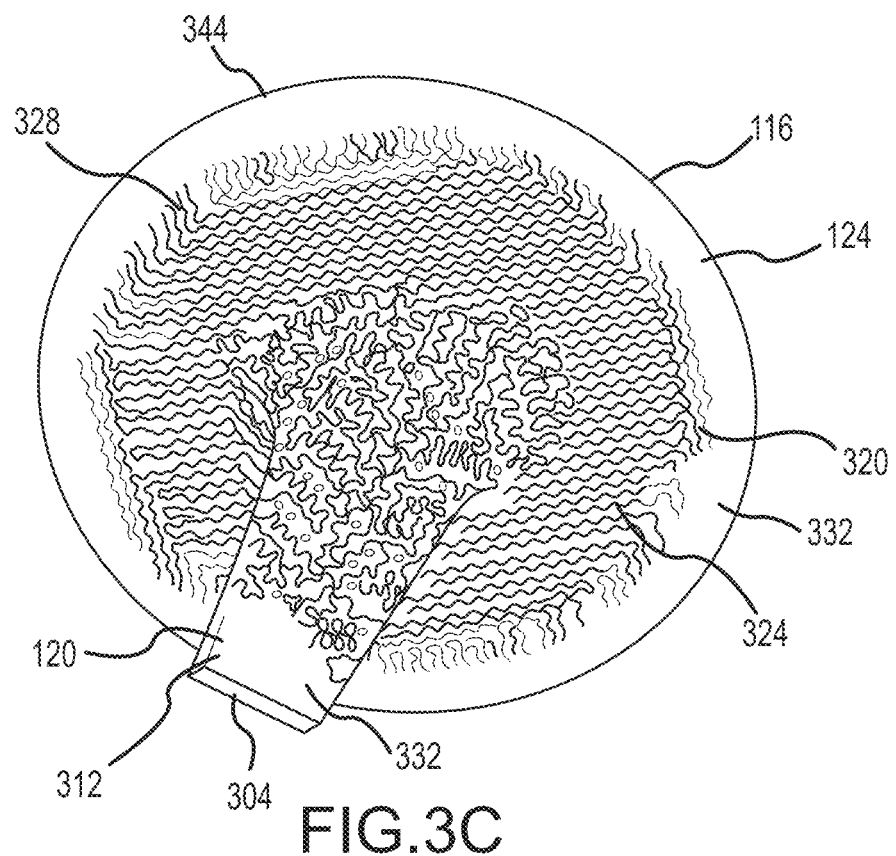
Figure 4A:
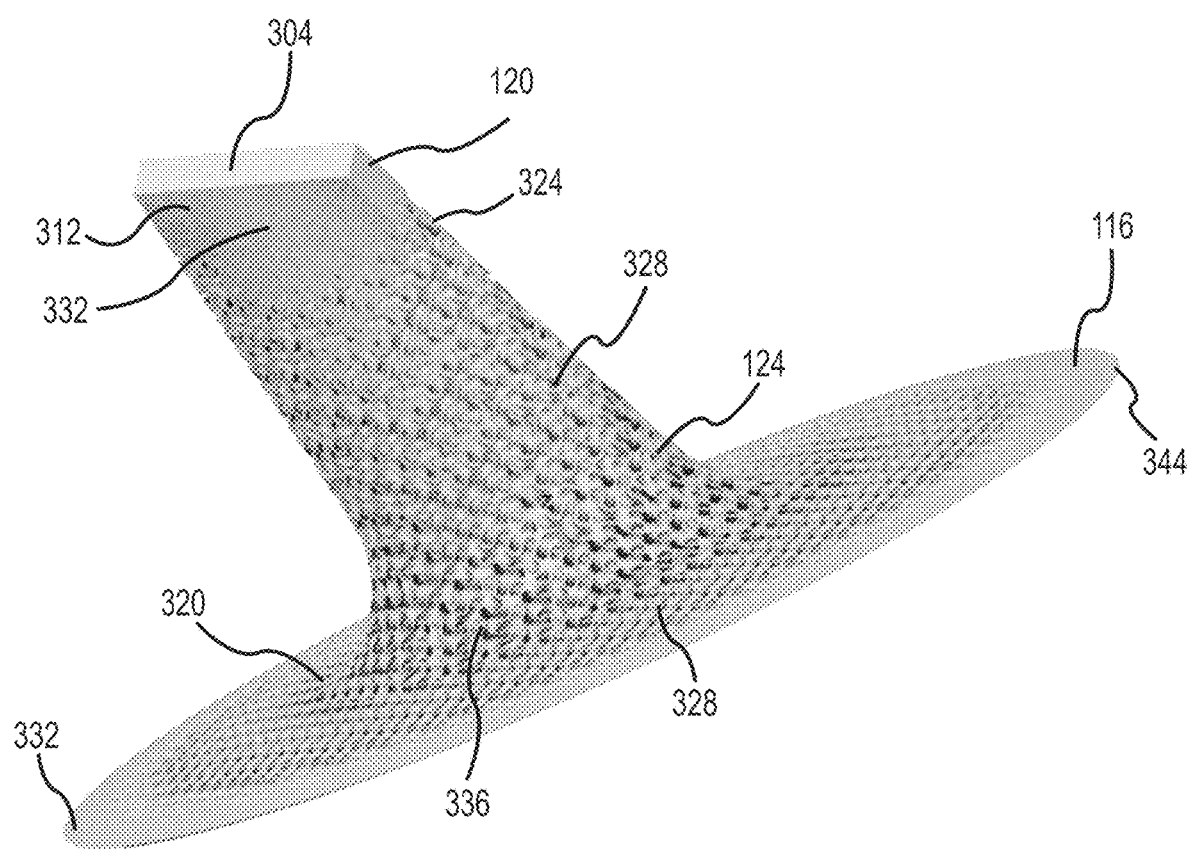
FIGS. 4A-4D are images illustrating a radiator in accordance with embodiments of the present disclosure.
Figure 4B:
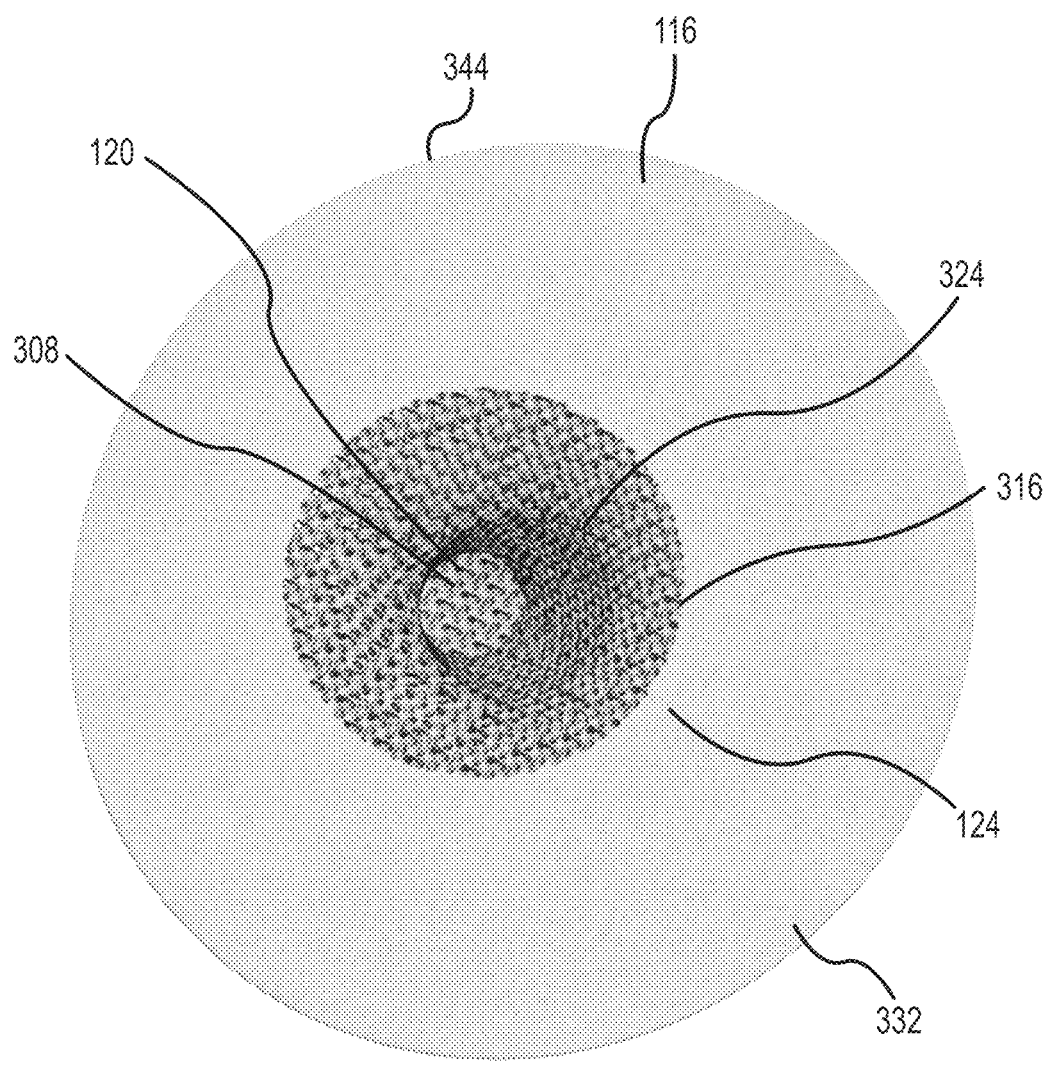
Figure 4C:
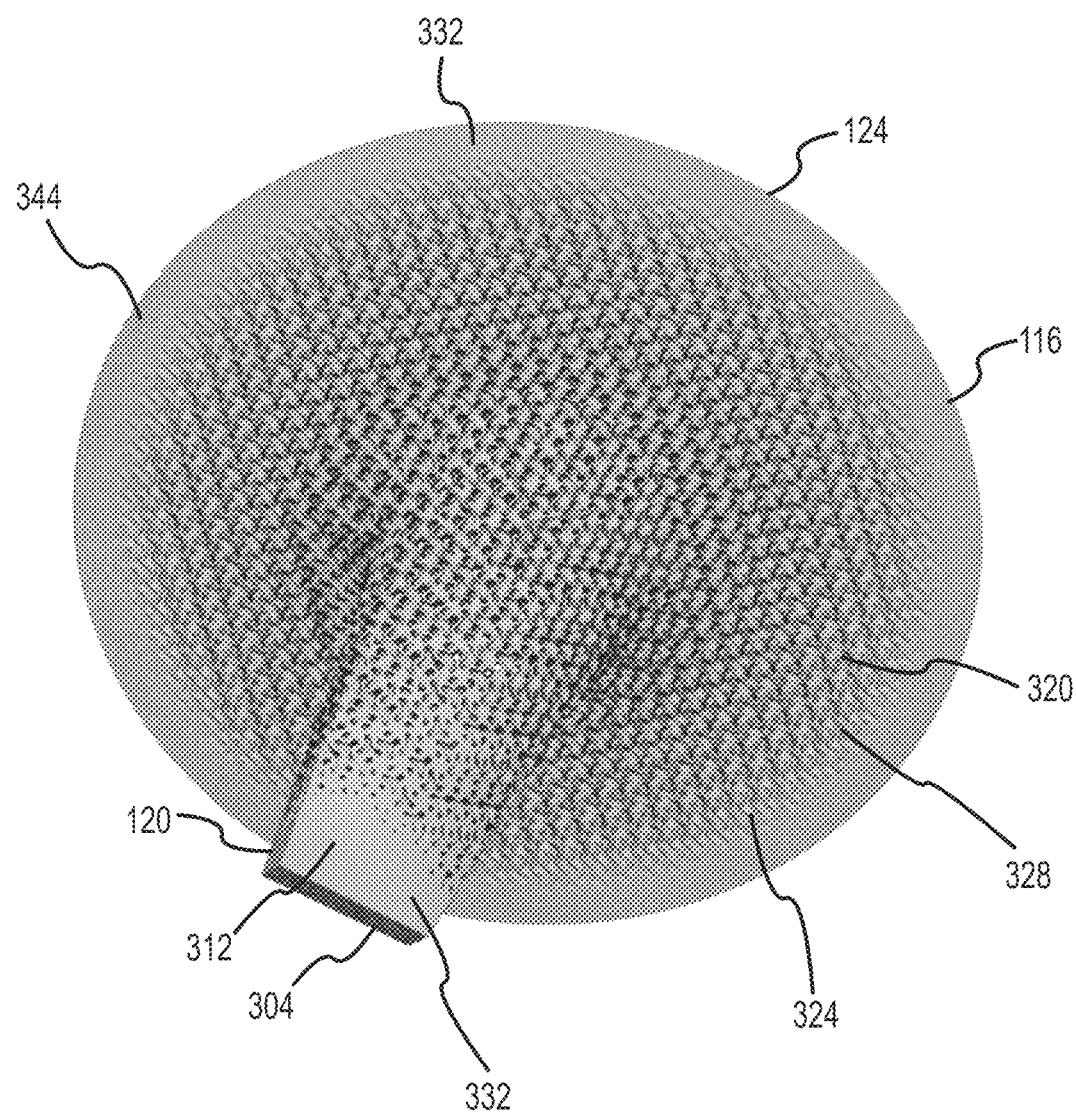
Figure 4D:
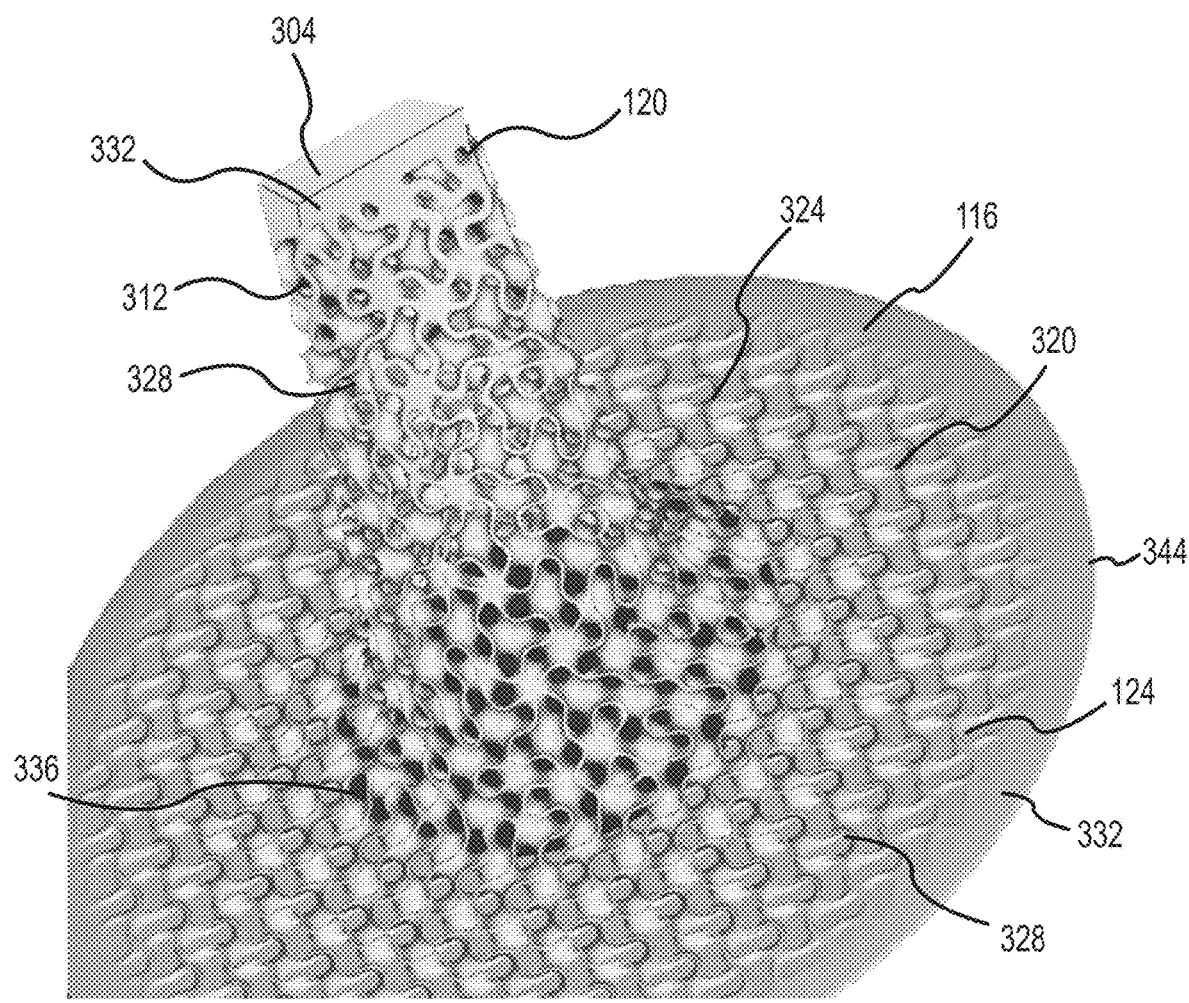

As shown in FIGS. 3B and 4B, the conductor bar 120 includes an exposed interior surface 308 that is internal to at least a portion of the radiator 116. In addition, the conductor bar 120 includes an exterior surface 312 that extends between the thermal interface surface 304 and the radiating surface 124. The radiating surface 124 also includes an interior surface 316 and an exterior surface 320. In accordance with at least some embodiments of the present disclosure, all of the various radiator 116 portion surfaces 308, 312, 316, and 320 can radiate heat passed to the radiator 116 from the heat source 112 into the surrounding environment. Moreover, the interior surface 308 of the conductor bar and the interior surface 316 of the radiating surface 124 together form a continuous interior surface, while the exterior surface 312 of the conductor bar 120 and the exterior surface 320 of the radiating surface 124 together from a continuous exterior surface. In accordance with further embodiments of the present disclosure, there is no discontinuity at the interfaces between the interior 308 and 316 or exterior 312 and 320 surfaces.

The conductor bar 120 can be configured as a solid piece of heat conductive material. The thermal interface surface 304 can be configured to maximize thermal contact between the radiator 116 and the heat source 112. For example, the thermal interface surface 304 can be configured as a smooth, planar surface that is placed in direct contact with a smooth, planar surface of the heat source 112 or of an intermediate heat transfer structure. As another example, the thermal interface surface 304 can include a patterned surface that is configured to mate with a similarly patterned surface of the heat source 112 or of an intermediate heat transfer structure in an interlocking fashion. The conductor bar 120 is generally a solid structure. The conductor bar 120 primarily functions to conduct heat from the heat source to surfaces 308, 312, 316 and 320 of the radiator 116, from which the heat is radiated. In addition, the conductor bar 120 can function to place the radiating surface 124 of the radiator 116 at a selected location and orientation relative to the heat source 112, the platform 108, or other structures. In accordance with embodiments of the present disclosure, at least some of the interior 308, exterior 312, or both the interior 308 and exterior 312 surfaces of the conductor bar 120 include surface features 324.

The radiating surface 124 extends from the conductor bar 120. The radiating surface 124 can be configured so as to replicate a hohlraum radiator. In general, the overall form of the radiating surface 124 is configured to maximize a radiating capacity of the radiator 116. In addition, the overall form of the radiating surface 124 can be asymmetrical about one or more axes. In accordance with at least some embodiments of the present disclosure, the radiating surface 124 has a generally fluted or bell-like form. Moreover, the radiating surface 124 can include surfaces 316 and 320 that in overall form are in at least some areas concave or convex. In at least some areas, for instance surrounding all or a portion of the interior surface 308 of the conductor bar 120, the radiator surface 124 can be in the form of a tubular structure. Moreover, at least some of the interior 316, exterior 320, or both the interior 316 and exterior 320 surfaces of the radiating surface 124 can include surface features 324. Where one or both of the interior 308 and exterior 312 surfaces of the conductor bar 120 also includes surface features 324, the structure of those surface features 324 can seamlessly extend across at least portions of the conductor bar 120 interior 308 and exterior 312 surfaces and the corresponding surfaces 316 and 320 of the radiating surface 124.

Figure 3D:
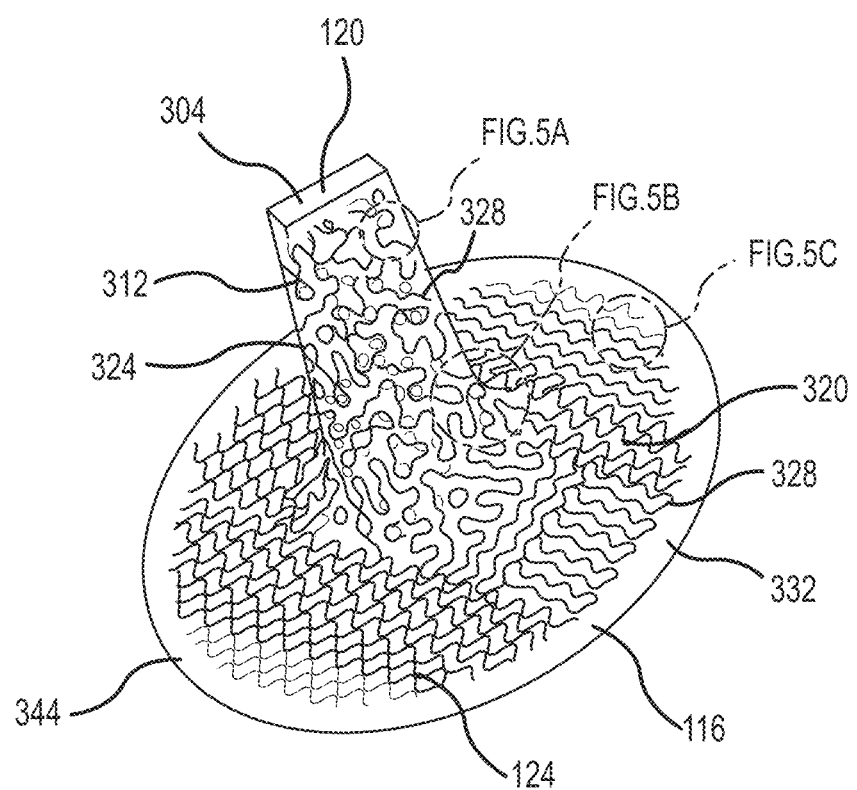
Figure 5A:
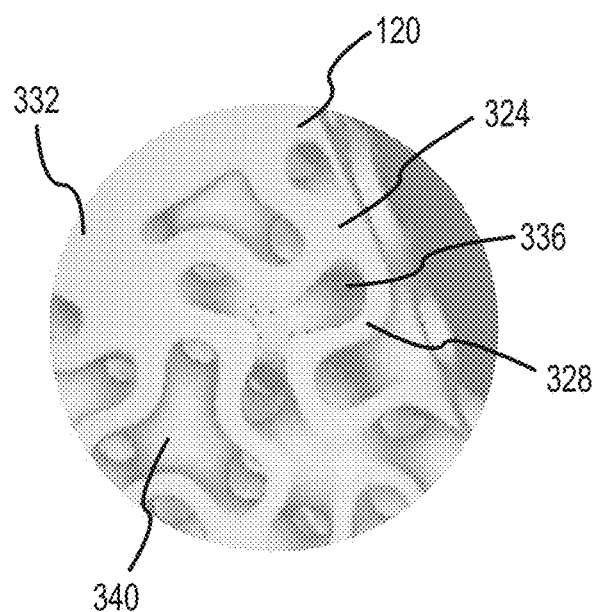
FIGS. 5A-5C are images illustrating details of a radiator in accordance with embodiments of the present disclosure.
Figure 5B:
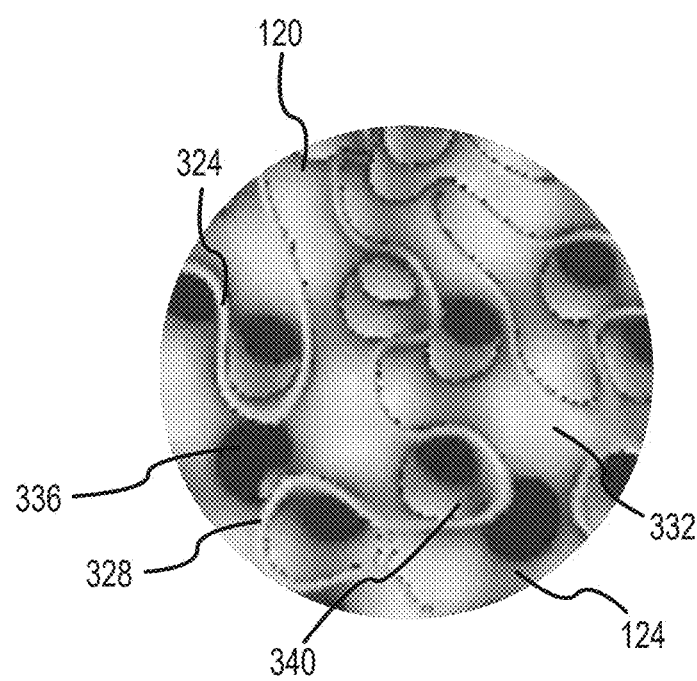
Figure 5C:
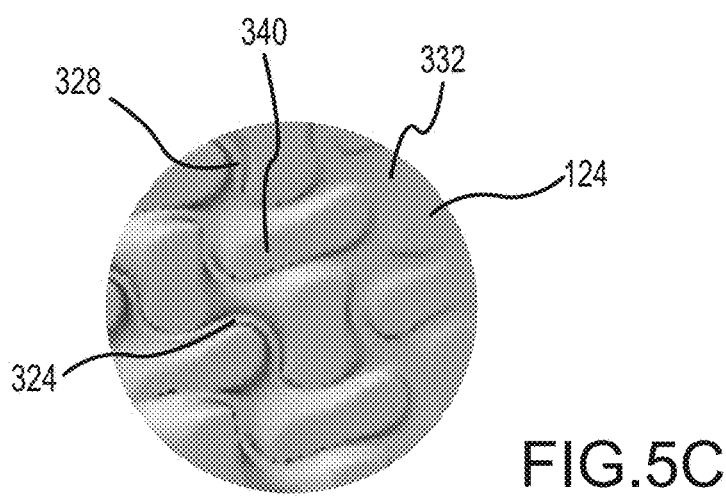

With reference now to FIGS. 5A-5C, aspects of surface features 324 extending across portions of the exterior surface 312 of the conductor bar 120 and portions of the exterior surface 320 of the radiating surface 124 of the radiator 116 in accordance with at least some embodiments of the present disclosure, taken from the indicated areas FIG. 3D, are depicted. As shown, the surface features 324 can be configured as macroscopic features that increase the apparent surface area of the radiator 116. The surface features 324 can include, but are not limited to, structural members 328, smooth (at least on a macroscopic scale) solid surface areas 332, and voids, through holes or apertures 336. Surface features 324 in the form of structural members 328 can extend from one of the surfaces 308, 312, 316, 320, and can be configured to provide increased structural support as compared to a smooth surface 332. In accordance with at least some embodiments of the present disclosure, the inclusion of structural members 328 enables the overall mass of the radiator 116 to be decreased as compared to an otherwise similar radiator 116 that did not include structural members 328. In accordance with embodiments of the present disclosure, the surface features 324 are integral to the radiator 116. In accordance with at least some embodiments of the present disclosure, surface features 324 in the form of structural members 328 are configured as an optimized non-stochastic three-dimensional lattice structure. Furthermore, such lattice-type structures can be configured as open cellular structures with a continuous network of truss-like structural members 328 defining unit cells 340. In particular, each unit cell 340 is at least partially bounded by one or more structural members 328. The unit cells 340 defined by the structural members 328 can be closed or partially closed areas containing a smooth solid surface area 332. Alternatively or in addition, at least some of the unit cells 340 defined by structural members 328 can be entirely or partially occupied by one or more through holes or apertures 336. In accordance with still other embodiments of the present disclosure, some or all of the unit cells 340 defined by structural members 328 can include smooth solid surface areas 332 and areas in which an aperture 336 is disposed. In accordance with still other embodiments of the present disclosure, multiple apertures 336 can be formed within a single unit cell 340. In accordance with at least some embodiments, and as depicted in FIGS. 5A-5C, the surface features 324 can be configured as a lattice structure in the form of a triply periodic minimal surface.

Where the radiator 116 includes surface features 324 in the form of structural members 328, the density and relief of such structural members 328 can vary with distance from the thermal interface area 304. For instance, and as depicted in FIGS. 3A-3D and FIGS. 4A-4D, the exterior surface 312 of the conductor bar 120 immediately adjacent the thermal interface area 304 can be configured as a smooth, solid surface area 332 without any structural members 328. At some distance from the thermal interface area 304, the exterior surface 312 and or 320 can begin to include structural members 328. The density, relief or both density and relief of the structural members 328 can be different at different locations along the radiator 116. As illustrated in the present example, the relief and/or density of the structural members 328 can gradually increase with increasing distance from the thermal interface area 304, until a maximum area of structural member 328 relief midway between the thermal interface area 304 and a distal edge 344 of the radiating surface 124. From that intermediate distance to the distal edge 344 of the radiating surface 124, the density and/or relief of the surface features 324 can gradually decrease until the surface features 324 disappear, leaving a smooth solid surface area 332 adjacent the distal edge 344.

Alternatively or in addition to variations in surface features 324 in the form of structural members 328, surface features 324 in the form of solid surface areas 332 and apertures 336 can vary with distance from the thermal interface area 304. For instance, and as depicted in FIGS. 3A-3D and FIGS. 4A-4D, the exterior surface 312 of the conductor bar 120 can be configured as a solid surface area 332. Moreover, as structural members 328 begin to emerge, unit cells between adjacent structural members or portions of structural members 328 are occupied by solid surface areas 332. At some distance from the thermal interface area 304 and before an area midway between the thermal interface area 304 and the distal edge 344 of the radiating surface 124 is reached, apertures 336 begin to appear, such that some unit cells 340 include at least one aperture 336, while other unit cells 340 are entirely occupied by a smooth solid surface area 332. Around the area midway between the thermal interface area 304 and the distal edge 344, a proportion of each unit cell 340 occupied by one or more apertures 336 has reached a maximum. For example, each unit cell 340 include can at least one aperture 336. As another example, the entire area of at least some unit cells 340 can be configured as an aperture 336. The proportion of areas of unit cells 340 that are occupied by one or more apertures 336 can then gradually decrease until the smooth solid surface area 332 of this example is reached.

As another macroscopic scale feature of the radiator structure 124, it can be configured to have an overall shape that exposes the interior surface 308 of the conductor bar 120 and the interior surface 316 of the radiator structure 116 to space (see FIGS. 3B and 4B). This overall shape of the radiator 316 can be configured as required by a particular application (e.g. the requirements of the platform 108 and the heat source 112). In addition, the overall shape of the radiator 116, or at least the overall shape of the radiating structure 124 of the radiator 116, can be configured to increase the apparent or effective surface area of the radiator 116. Accordingly, the overall shape of the radiator 116 can include flared, bell or petal like portions that define concave exterior surface portions, convex exterior surface portions, concave interior surface portions, and/or convex interior surface portions. As another example, the radiator 116 or portions thereof can be in the form of a Winston cone. However, although the shape of a radiator 116 in accordance with embodiments of the present disclosure can include a radiating surface 124 with an exterior surface 316 that is generally curved in form, it is not constrained to follow the limitations of waveguide type cavities.

Figure 6:
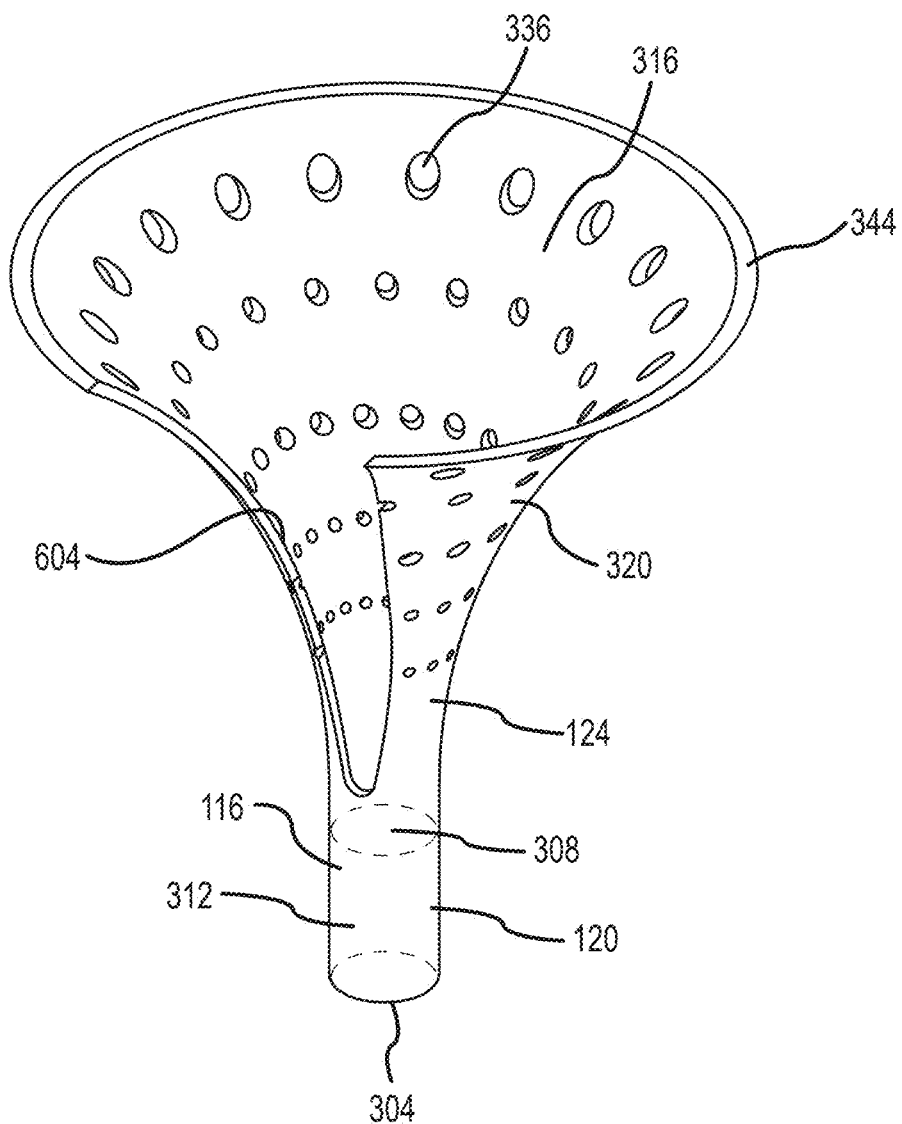
FIG. 6 is a view of a radiator in accordance with other embodiments of the present disclosure.

As another example, and as illustrated in FIG. 6, the overall shape of the radiator 116, or at least the overall shape of the radiating structure 124, can be configured like that of a flower or a bell. Moreover, as also shown in FIG. 6, the overall shape of the radiating structure 124 can include a seam or opening 604 that increases in width with increasing distance from the thermal interface area 304. Accordingly, exposure of the interior surface 308 of the conductor bar 120 is facilitated by both the fluted form of the radiating structure 124 and by the seam 604 formed in the radiating structure 124. In this example, apertures 336 are formed in an otherwise smooth surface of the radiating structure 124, and increase in area with distance from the conductor bar 120.

Figure 7:
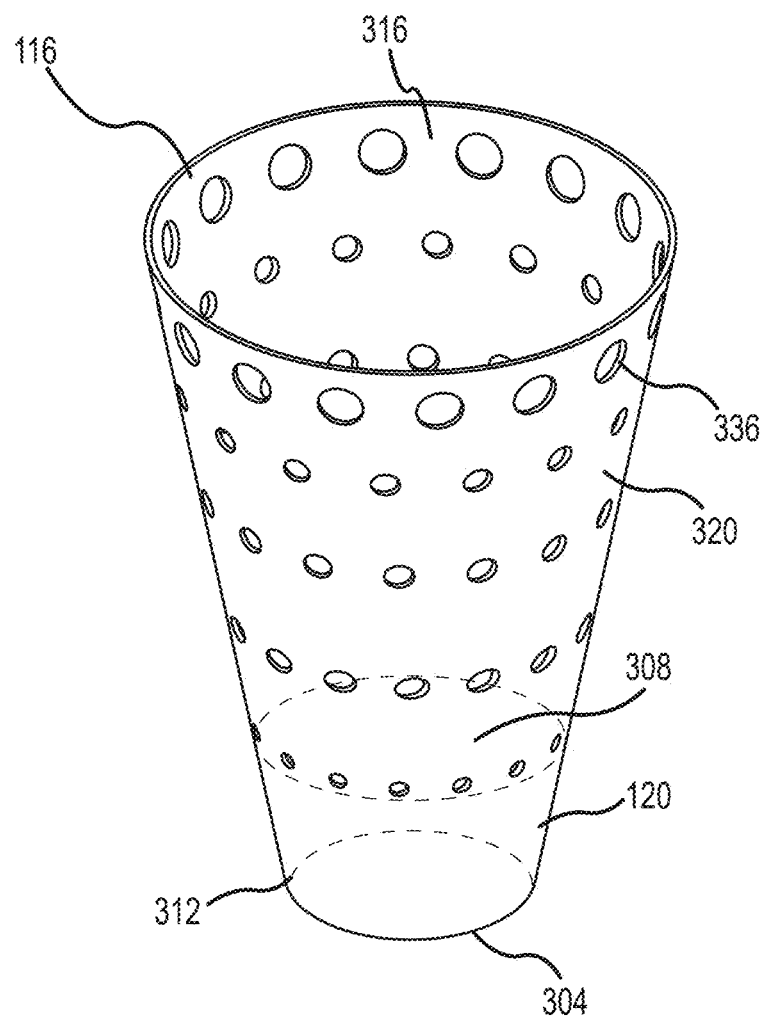
FIG. 7 is a view of a radiator in accordance with other embodiments of the present disclosure.

Still another example of a radiator 116 in accordance with embodiments of the present disclosure is illustrated in FIG. 7. In this example, the apparent surface area of the radiator 116 can be increased by configuring the radiating surface 124 in the form of a tubular or hollow structure with a diameter that increases with distance from the thermal interface area 304 of the conductor bar 120. In this example, the increase in diameter is linear, resulting in a radiator 116 having an overall shape in the form of a truncated cone. The increase can be non-linear, and can be configured as a generally bell or trumpet shaped overall form. As in other examples, the radiating structure 124 is configured such that an interior surface 308 of the conductor bar 120 is exposed.

Figure 8A:
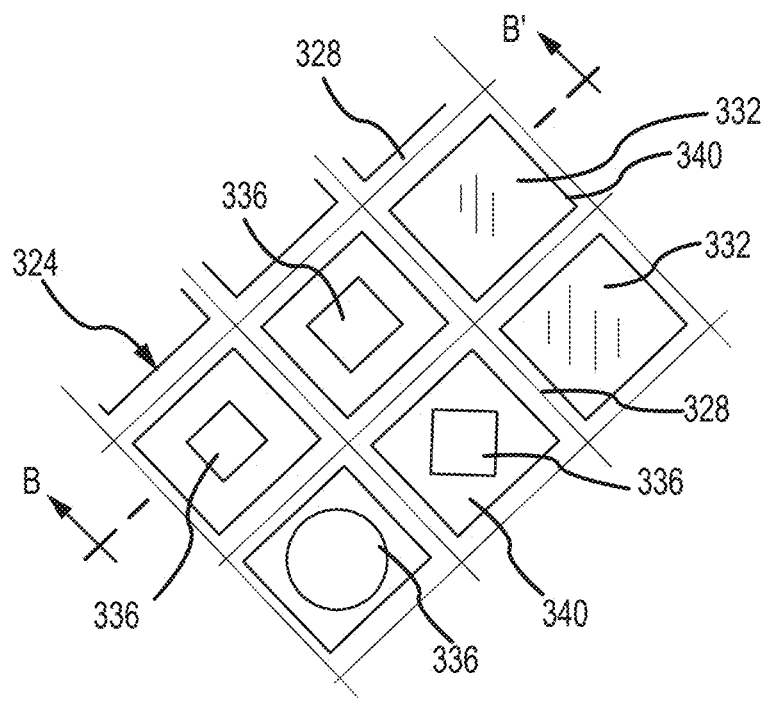
FIGS. 8A-8B are images illustrating details of a radiator in accordance with other embodiments of the present disclosure.
Figure 8B:
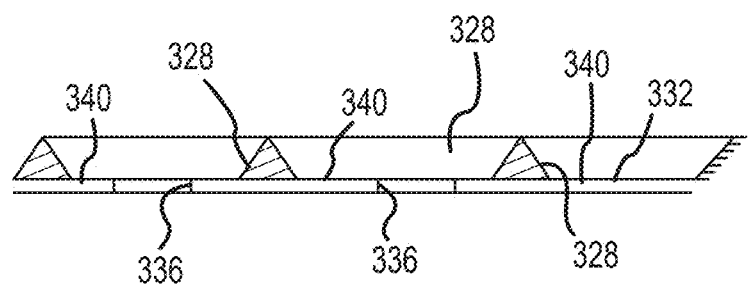

Although not shown in FIGS. 6 and 7, such embodiments can include structural features 324. Suitable structural features 324 can include a triply periodic minimal type structure, as depicted in FIGS. 3A-5C. Alternatively or in addition, other surface features 324 can be formed on some or all of the surfaces a radiator 116 in accordance with embodiments of the present disclosure. For example, as shown in FIG. 8A, which depicts an area of an exterior surface 312 or 320 of a radiator 116, and FIG. 8B, which is a sectional view taken along line B-B' in FIG. 8A, structural members 328 configured as a regular lattice type structure can be formed on at least portions of some or all of the surfaces 308-320 of the radiator 116. As in other embodiments, each unit cell 340 defined by the structural members 328 can bound solid surface areas 332, can include one or more apertures 336 formed in a solid surface area 332, or can be entirely occupied by an aperture 336. Although not limited to any particular form, as depicted in FIG. 8B, the structural members 328 can be triangular in cross-section.

In accordance with any of the embodiments of the present disclosure, some or all of the surfaces 308-320 of the radiator 116 can be formed with features that facilitate the radiation of heat to the surrounding environment. For example, the surfaces 308-320 can be formed with a selected surface roughness or microscopic features (i.e. features that are <1 mm in any one dimension) that presents an increased apparent surface area on a microscopic scale. As another example, some or all of the surfaces 308-320 of the radiator 116 can be entirely or partially covered by a carbon nanotube structure.

A radiator 116 in accordance with embodiments of the present disclosure can be formed as a unitary structure using additive manufacturing processes. Accordingly, at least the conductor bar 120 and radiating surface portions 124 of the radiator 116 can be formed integrally to one another. Moreover, the transition between the conductor bar 120 and radiating surface 124 portions of the radiator 116 can be entirely seamless. Examples of materials that can be used to produce a radiator 116 as provided herein include, but are not limited to, aluminum, copper, beryllium, or various alloys. The material composition of the radiator 116 can be uniform. Alternatively, different materials can be used in different areas of the radiator 116. In addition, while the conductor bar 120 and radiating surface 124 portions of the radiator 116 can be formed as a single, integrated structure, other elements, such as a surface coating of carbon nanotubes and additional support elements, such as titanium support elements extending from the radiating surface to an element of the platform 108 carrying the heat source 112 and the radiator 116, can be attached to or formed with the remainder of the radiator 116.

Figure 9:
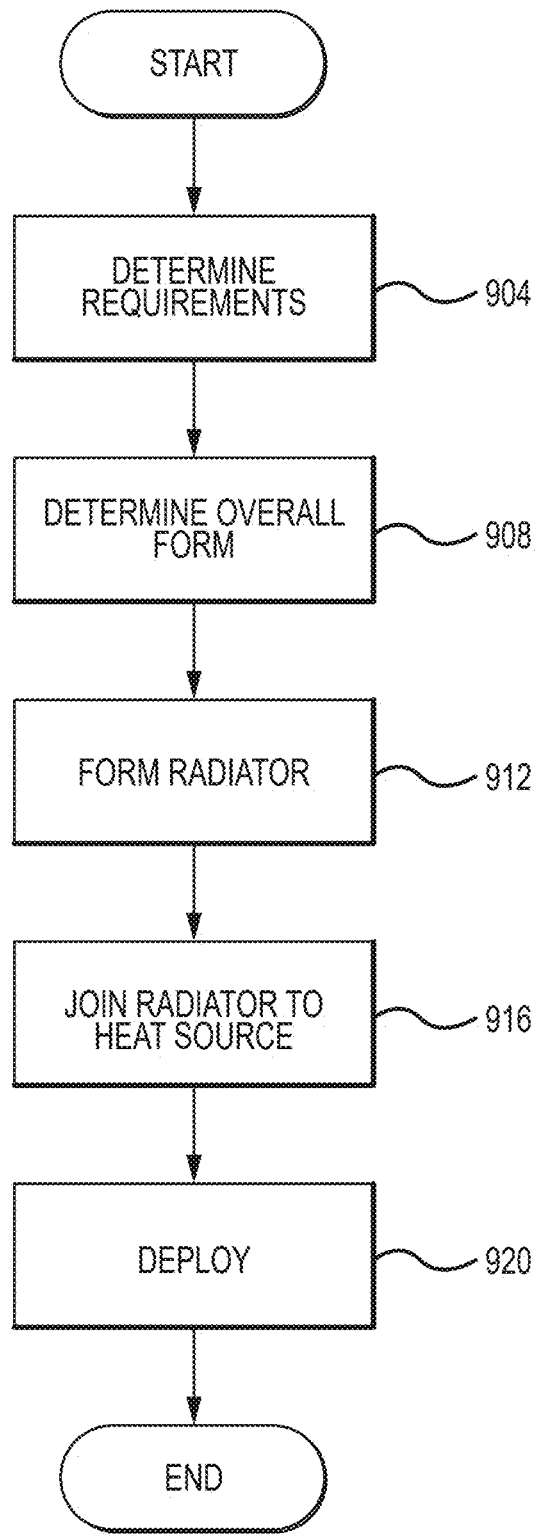
FIG. 9 is a flowchart illustrating aspects of a method for providing a radiator in accordance with embodiments of the present disclosure.

FIG. 9 is a flowchart illustrating aspects of a method for providing a radiator 116 in accordance with embodiments of the present disclosure. Initially, the performance requirements of the radiator 116 are determined (step 904). Determining the performance requirements can include determining the amount of heat the radiator will be required to reject, the volume available for placement of the radiator 116, and the orientation or orientations that the radiator 116 will be in relative to the Sun or other sources of heat during operation.

From the performance requirements, the overall form, surface area, macroscopic surface features, microscopic surface features and material composition of the radiator 116 can be determined (step 908). The physical features of the radiator 116 can include the shape of the various portions of the overall radiator 116 structure, macroscopic surface features 324, microscopic surface features, and material choices.

The shape of the radiator 116 structure can be determined in view of the size of the thermal interface or area of contact 204 between the radiator 116 and the heat source 112, the amount of heat the radiator 116 is required to reject, the operating environment of the radiator 116, the space available for the radiator 116, and the orientation of the radiator 116. In addition, aspects of the shape of the radiator 116 can be determined in view of the structural requirements for the radiator 116.

The macroscopic surface features 324 of the radiator 116 can include the inclusion and configuration of a support structure 328, which can be disposed in the form of a lattice that defines a plurality of unit cells 340. In addition, the macroscopic surface features can include areas of the radiator 116 surface, including areas corresponding to unit cells 340, that are relatively smooth, and/or that include one or apertures 336. The inclusion of macroscopic surface features 324 can be used to tune or optimize various characteristics of the radiator 116. For instance, surface features 324 in the form of a lattice support structure 328, can be included to provide enhanced structural rigidity as compared to a radiator 116 structure formed without such features. As another example, the inclusion of apertures 336 can be used to reduce the overall weight of the radiator 116. The presence, extent, and/or prominence of surface features 324 can be varied across different areas of the radiator 116. For instance, surface features 324 in the form of a support structure 328 can be denser and/or more prominent in areas of the radiator 116 having a relatively large proportion of apertures 336.

Examples of microscopic surface features that can be incorporated into the radiator include a selected surface roughness and surface coatings, such as but not limited to carbon nanotube structures, paints, or the like. As with macroscopic features 324, the presence and characteristics of any microscopic features can vary with location on the overall radiator 116 structure. In accordance with still further embodiments of the present disclosure, the material composition of the radiator 116 can be varied. For instance, the conductor bar 120 portion can incorporate or can be formed from a material selected for excellent mechanical strength and heat transfer characteristics, such as copper or aluminum. As another example, the radiating surface 124 portion can incorporate or can be formed from materials that are relatively light and that have excellent heat transfer characteristics, such as beryllium or various alloys.

Next, the radiator 116 can be formed (step 912). In accordance with embodiments of the present disclosure, the radiator 116 is formed as an integral unit, rather than as separate components that are joined to one another. As an example, forming the radiator 116 can be accomplished using additive manufacturing techniques. Other techniques that can be used to form the radiator 116 include milling, casting, or a combination of different techniques, such as additive manufacturing and milling. Forming the radiator 116 can also include applying any surface coatings.

The formed radiator 116 can then be interconnected to the heat source 112 (step 916). In accordance with embodiments of the present disclosure, interconnecting the radiator 116 to the heat source can include joining the thermal interface surface 304 of the radiator to a mating surface of the heat source 112. In accordance with at least some embodiments of the present disclosure, a thermally conductive material can be disposed on one or both the thermal interface surface 304 and the mating surface of the heat source 112 prior to their being joined. In accordance with still further embodiments, such a thermally conductive material can be in the form of an adhesive that, alone or in combination with mechanical or other interconnecting elements, joins the radiator to the heat source 112. In accordance with still other embodiments of the present disclosure, the radiator 116 can be joined to the heat source 112 by an intermediate heat transfer structure.

After the radiator 116 has been interconnected to the heat source 112, it can be operationally deployed (step 920). In operation, the radiator 116 removes heat from the heat source entirely passively. Accordingly, reliability of operation is assured. In addition, the unitary nature of a radiator 116 as disclosed herein can provide enhanced efficiency, as it enables a system 104 incorporating the radiator 116 to have a minimal number of separate, interconnected components. The process for providing a radiator 116 is then complete.

Figure 10:
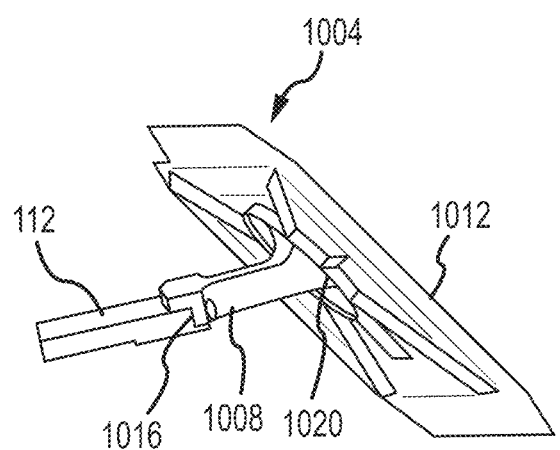
FIG. 10 illustrates a prior art radiating system.

FIG. 10 depicts an example prior art radiator assembly 1004 connected to a heat source 112 at an area of contact 1016. In this example, the radiator assembly 1004 includes a conductor bar 1008 that is formed as a first component and a radiator element 1012 that is separately formed as a second component and that is interconnected to the conductor bar 1008 at an interface or interconnection 1020 to form the radiator assembly 1004. As can be appreciated by one of skill in the art after consideration of the present disclosure, the interface 1020 between the conductor bar 1008 and the radiator element 1012 can adversely affect the transfer of heat to the radiator element 1012. This additional interface is absent in a radiator 116 in accordance with embodiments of the present disclosure. Furthermore, unlike embodiments of the present disclosure, the prior art radiator element 1012 is a generally planar structure, without features to increase the apparent surface area. Accordingly, for a given overall volume, the prior art radiator assembly 1004 has less apparent surface area than a radiator 116 as disclosed herein. In addition, the radiator element 1012 generally blocks or impedes radiation from the conductor bar 1008 into free space. Accordingly, the heat rejection performance of the prior art radiator assembly 1004, for a given size of the radiator assembly 1004, is less than that of a similarly sized radiator 116 in accordance with embodiments of the present disclosure for this additional reason.

The foregoing has been presented for purposes of illustration and description. Further, the description and the figures provided herewith are not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A radiator, comprising:
a conductor bar, including:
a contact area;
an interior surface; and
an exterior surface; and
a radiating surface, including:
an interior surface; and
an exterior surface,
wherein the conductor bar and the radiating surface are integral to one another,
wherein the interior surface of the conductor bar and the interior surface of the radiating surface form a continuous interior surface of the radiator, and
wherein the exterior surface of the conductor bar and the exterior surface of the radiating surface form a continuous exterior surface of the radiator.

2. The radiator of claim 1, further comprising:
a lattice structure, wherein the lattice structure is disposed on at least portions of the exterior surface of the radiator.

3. The radiator of claim 1, further comprising:
a plurality of voids formed in the radiating surface.

4. The radiator of claim 1, further comprising:
a carbon nanotube structure on at least one of the interior surface of the radiator and the exterior surface of the radiator.

5. A method for forming a radiator, comprising:
forming a conductor bar using an additive manufacturing process, wherein the conductor bar includes a contact area, an interior surface, and an exterior surface; and
forming a radiating surface using the additive manufacturing process, wherein the radiating surface includes an interior surface and an exterior surface,
wherein the conductor bar and the radiating surface are integral to one another,
wherein the interior surface of the conductor bar and the interior surface of the radiating surface form a continuous interior surface, and
wherein the exterior surface of the conductor bar and the exterior surface of the radiating surface form a continuous exterior surface.

6. The method of claim 5, further comprising:
thermally connecting the contact area of the conductor bar to a heat source.

7. The radiator of claim 1, wherein the radiating surface forms a tubular structure.

8. The radiator of claim 1, wherein at least portions of the radiating surface include surface features.

9. The radiator of claim 1, wherein an area of the radiating surface increases with distance from the conductor bar.

10. The radiator of claim 1, wherein the interior surface of the radiating surface includes a convex surface portion.

11. The radiator of claim 1, wherein the exterior surface of the radiating surface includes a concave surface portion.

12. The radiator of claim 1, wherein the interior surface of the radiating surface includes a convex surface portion, and wherein the exterior surface of the radiating surface includes a concave surface portion.

13. The radiator of claim 1, wherein the radiating surface is generally bell-shaped.

14. The radiator of claim 1, wherein the radiating surface defines a generally tubular portion proximate to the conductor bar, and wherein the radiating surface defines a flared surface distal from the conductor bar.

15. The radiator of claim 1, wherein the radiating surface is a solid surface in at least an area proximate to the conductor bar, and wherein the radiating surface includes voids that extend between the interior surface of the radiating surface and the exterior surface of the radiating surface in at least an area distal from the conductor bar.

16. The radiator of claim 15, wherein a proportion of the voids to solid surface of the radiating surface increases with distance from the conductor bar.

17. The radiator of claim 1, wherein the radiator includes macroscopic radiating features and microscopic radiating features.

18. The radiator of claim 17, wherein the microscopic radiating features are carbon nanotubes.

19. The radiator of claim 1, wherein at least portions of the radiating surface include triply periodic minimal surface features.

20. The radiator of claim 1, wherein the conductor bar and the radiating surface of the radiator are both formed from a first material.

* * * * *